United States Patent
Turner et al.

(10) Patent No.: US 7,375,361 B2
(45) Date of Patent: May 20, 2008

(54) OPTICAL ALIGNMENT DEVICE FOR MACHINE TOOL

(75) Inventors: Brian John Turner, Bristol (GB); Timothy David Hall, Bristol (GB)

(73) Assignee: Airbus UK Limited, Bristol (GB)

( * ) Notice: Subject to any disclaimer, the term of this patent is extended or adjusted under 35 U.S.C. 154(b) by 493 days.

(21) Appl. No.: 11/058,905

(22) Filed: Feb. 16, 2005

(65) Prior Publication Data

US 2005/0232713 A1 Oct. 20, 2005

(30) Foreign Application Priority Data

Feb. 17, 2004 (GB) ................................. 0403479.9

(51) Int. Cl.
*G01N 21/00* (2006.01)
*B23Q 15/00* (2006.01)

(52) U.S. Cl. .............................. 250/559.3; 250/559.29; 356/399; 356/400; 356/138; 356/614; 33/286; 408/8; 408/9; 408/13; 408/16; 340/686.2; 340/686.1

(58) Field of Classification Search ........... 250/559.29, 250/559.3; 356/247–255, 399, 400, 138, 356/614; 33/286; 408/8, 9, 13, 16; 700/192; 340/686.1, 686.2

See application file for complete search history.

(56) References Cited

U.S. PATENT DOCUMENTS

| | | | |
|---|---|---|---|
| 2,407,845 A | | 9/1946 | Nemeyer |
| 3,707,043 A | | 12/1972 | Jones |
| 4,785,544 A | | 11/1988 | Heinsius et al. |
| 5,361,504 A | | 11/1994 | Huang |
| 5,917,587 A | * | 6/1999 | Rando ..................... 356/149 |
| 6,088,623 A | * | 7/2000 | Yowler et al. ............. 700/56 |
| 6,375,395 B1 | * | 4/2002 | Heintzeman .............. 408/16 |
| 6,804,892 B1 | * | 10/2004 | Yung et al. ............... 33/286 |
| 6,813,843 B1 | | 11/2004 | Faubion |
| 6,878,954 B2 | * | 4/2005 | Butler et al. ............ 250/559.3 |

(Continued)

FOREIGN PATENT DOCUMENTS

CA 1334347 2/1995

(Continued)

OTHER PUBLICATIONS

Summary of HP122K—Esprit 12v Cordless Hammer Drill.

(Continued)

*Primary Examiner*—Davienne Monbleau
(74) *Attorney, Agent, or Firm*—Patterson, Thuente, Skaar & Christensen, P.A.

(57) ABSTRACT

The orientation of a machine 2 relative to a work-piece 10 is manually controlled by means of an alignment device 4. The device 4 includes a light source 24 rigidly attached to a foot 12 that is resiliently movably attached to the main body 18 of the device. The body 18 of the device 4 houses a light detector 26 for detecting a light beam from the light source 24, the position of the region on the detector 26 illuminated by the beam depending on the orientation of the machine 2 relative to the work-piece 10. The operator is provided with feedback on whether the machine 2 is correctly aligned with a target orientation (usually perpendicular to the surface) and concerning the direction of corrective movement required, if any.

13 Claims, 7 Drawing Sheets

U.S. PATENT DOCUMENTS

| | | | |
|---|---|---|---|
| 7,164,474 B2* | 1/2007 | Arntson et al. | 356/154 |
| 7,200,516 B1* | 4/2007 | Cowley | 702/151 |
| 2002/0164217 A1 | 11/2002 | Peterson | |
| 2003/0106226 A1* | 6/2003 | Tacklind et al. | 33/286 |
| 2004/0187326 A1* | 9/2004 | Yung et al. | 33/286 |

FOREIGN PATENT DOCUMENTS

| | | |
|---|---|---|
| DE | 1 077 442 | 11/1955 |
| DE | 44 35 573 A1 | 4/1996 |
| DE | 198 06 032 A1 | 9/1999 |
| DE | 100 13 943 A1 | 3/2001 |
| EP | 1 279 466 A2 | 1/2003 |
| FR | 2 534 169 | 4/1984 |
| FR | 2 653 046 | 4/1991 |
| GB | 2 161 599 A | 1/1986 |
| GB | 2 307 756 A | 6/1997 |
| GB | 2 349 351 A | 11/2000 |
| GB | 2 383 138 A | 6/2003 |

OTHER PUBLICATIONS

Summary of HP12K—Esprit 12v Cordless Drill.
Web page: http://www.rockler.com/findit.cfm?page=2408 "Drill Guide Kit" (Rockler).
Web page: http://www.alignritetool.com/drillguidees.htm "Drill Guides" (Align-Rite).
Web page: http://www.handymanclub.com/document.asp?dID=1722 "A Hassle-free drill guide" (Handyman Club of America).
Web page: http://www.thebic.co.uk/sections.php?op=viewarticle&artid=3 "Anti-Slip Drill Guide" (Staffordshire & Black Country, Business Innovation Centre).
Web page: http://www.rockler.com/ecom7/product_details.cfm?&sku=2405&cs=1 "PortableDrill Guide" (Rockler).

* cited by examiner

OPTICAL ALIGNMENT DEVICE FOR MACHINE TOOL

FIELD OF THE INVENTION

This invention relates to a device and method that allows a machine, for example a hand-held tool, to be aligned with respect to a surface of a work-piece to be machined by the machine.

BACKGROUND OF THE INVENTION

When machining a work-piece it is often desirable to align the machine in accordance with a target orientation in relation to the work-piece. By way of example, when drilling holes in a work-piece, it is often desirable for a hole to be drilled perpendicular to the surface of the work-piece. For example, if the finished hole is to be formed through two or more components, which are then to be fastened together with a fastener, such as a bolt, and the hole is not perpendicular to the surface, then a fastener subsequently inserted in the hole will not seat properly and the joint so formed will not be as strong as that formed by a fastener in a perpendicular hole. Additionally, when drilling through from one side to the other of a work-piece, if the hole is not normal to the surface, then the drill may emerge from the reverse side of the work-piece in an incorrect location.

It is known to be unusual, even for skilled drill operators, to be able to drill holes repeatedly and consistently to the desired standard of accuracy using manually operated handheld drills. The required accuracy is even more difficult to achieve where access to the drilling location is restricted, as frequently happens in a production-line environment or in a domestic environment. Where access to the drilling location is particularly restricted, for example inside a small box-like structure where there is not enough space for a normal drilling tool to be held approximately perpendicular to the work-piece surface, a drilling tool with a 90° drive may be employed. When using this tool, the operator holds the main drill body approximately parallel to the work-piece surface and a gearbox on the end of the main drill body transfers the rotary drive through 90° so that the drilling axis is perpendicular to the work-piece surface. Operators find it very difficult to drill holes perpendicular to the work-piece surface using this sort of tool where they cannot sight directly along the drilling axis.

The desirability to align accurately a hand-held tool relative to a work-piece is not of course restricted to drills. In the aerospace manufacturing industry, other hand-held machines need to be so accurately aligned. By way of example, cold-working tools, which are used to expand drilled holes in metal components by a small amount to give added fatigue resistance to the component containing the hole, need to be properly aligned with the previously drilled hole. The cold-working gun is used by: (i) placing the jaw of the tool against the work-piece surface over the hole to be worked, with the axis of the tool held perpendicular to the surface, (ii) inserting an oversize mandrel through the hole and into the jaw of the tool; and (iii) the tool then pulling the mandrel through the hole, thus expanding the walls of the hole outwards. If the axis of the tool is inclined relative to the surface, rather than being held perpendicular, then the mandrel may be damaged or broken and the work-piece may also be damaged, thus incurring extra costs for tooling, rectification or scrapping.

The inconsistency of accuracy that can occur in a production situation because of the aforementioned problems can result in a high cost for re-work, or for scrapping, of incorrectly-machined components. Alignment devices for use with hand-held power tools would also be of assistance to trades-people, such as professional builders, carpenters and plumbers for example, and to DIY enthusiasts. Various alignment devices for hand-held tools such as drills are already known, but they can be bulky and unsuitable for use in confined spaces. Also, many of the prior art alignment devices require the use of separate distinct parts to function, are inflexible, provide only limited assistance to the user, are cumbersome, are complicated to use, and/or rely on a complicated array of mechanical parts that are prone to wear and possible malfunction.

It is an object of the present invention to provide an improved alignment device and/or to provide an alignment device that mitigates one or more of the above-mentioned potential disadvantages of the prior art devices and/or to provide an alignment device that is compact and simple to use, particularly for operations on production lines where repeatability of processes to high standards of accuracy is important.

SUMMARY OF THE INVENTION

According to the present invention there is provided an alignment device, the device being suitable for use with a machine that machines into a work-piece, the device including:

(a) a light source,
(b) a light detector for detecting light from the light source,
(c) a first portion that in use abuts a surface of the work-piece,
(d) a second portion that in use moves in dependence on the angular position of the machine relative to the work-piece, and
(e) an alignment indicator, the device being so arranged that in use:

(i) movement of the machine in at least one direction causes movement of both the first and second portions, whereas the machine is able to be rotated in such a way that the second portion, but not the first portion, rotates,
(ii) the intensity of the light received by the detector from the source depends on the relative positions and orientations of the first and second portions, and
(iii) the indicator outputs, in dependence on an electronic signal sent by the detector in response to the intensity of light received by the detector from the source, an indication of the deviation of the machine relative to the work-piece from a target orientation.

The deviation of the machine may be in the form of the deviation of a notional axis of the machine from a target axis. The target axis may for example be an axis that extends from the work-piece at the point of intersection of the notional axis of the machine and the surface of the work-piece, the target axis extending from the work-piece at a given angle relative to the work-piece. The notional axis of the machine is of course fixed relative to the machine, but need not be aligned with any longitudinal part of the machine. Preferably however, the notional axis of the machine is conveniently an axis of a machining part of the machine that acts on the work-piece. For example, if the machining part is a drill bit, the notional axis of the machine may be the axis of rotation of the bit. The target orientation may be 90 degrees to the surface being machined. The alignment device of the invention may thus be used to enable a machine operator to reliably machine a work-piece maintaining the machining part of the machine in line with or close to the normal of the surface of the work-piece by means of monitoring the output of the indicator and realigning the machine in the event that the indicator indicates that the machine has become misaligned.

Above it is stated that movement of the machine in at least one direction causes movement of both the first and second portions, whereas the machine is able to be rotated in such a way that the second portion, but not the first portion, rotates. Such an arrangement enables the alignment device to detect a change in the rotational position of the machine relative to the work-piece (rotational movement about a given axis causing relative movement between the first and second portions) without allowing movement in other directions (not causing relative movement between the first and second portions) to affect the operation of the alignment device. For example, on the one hand, the machine may be moved to machine different regions of the work-piece and/or may be moved towards and away from the work-piece without affecting the operation of the alignment device and, on the other hand, rotational movement affecting a change in the angle at which an axis of the machine meets the surface of the work-piece also affects the relative positions of the first and second portions and therefore enables the alignment device to detect a change in orientation of the machine relative to the work-piece. The alignment device may be so configured that in use any translational movement of the machine parallel to the surface of the work-piece to be machined causes movement of both the first and second portions. The alignment device may be so configured that in use the machine is able to be pivoted in any direction about a point in such a way that the second portion, but not the first portion, pivots. The pivoting point may for example be in the region of contact of the first portion and the surface of the work-piece. The machine may be restricted in the way in which it moves. For example, during machining the machine may be able only to pivot about one axis. Preferably, the machine is arranged such that it may effectively be freely moved in all directions.

The alignment indicator may have a plurality of indicating states. The alignment indicator may have a first indicating state, which represents the case where the deviation of the alignment of the machine from the target orientation is within one or more preset threshold directional deviation criteria. The alignment indicator may alternatively or additionally have a second indicating state, which represents the case where the deviation of the alignment of the machine from the target orientation is not within said one or more criteria. For example, the alignment indicator may have two indicating states only, namely an on state and an off state. One of the two states may indicate that the machine is correctly aligned and the other state may indicate that the machine is incorrectly aligned. One of the two states may be indicated by the absence of an output of the alignment indicator.

The one or more preset threshold directional deviation criteria may simply be in the form of a predetermined angular range. The alignment device may in such a case indicate that correct alignment has been achieved when it is detected that the angle of deviation from the target orientation is within a predetermined angular range. The angular deviation measured may be restricted to a given plane. Preferably, the source and detector are so configured that the angular deviation measured is the angle between an axis of the machine and a target axis of alignment. The predetermined angular range may be a range of 0 to 5°. The predetermined angular range may be a range of 0 to 3°. The predetermined angular range is preferably a range of 0 to 1°. The target axis may for example be normal to the surface being machined. The one or more preset threshold directional deviation criteria are advantageously able to be adjusted by the user. Thus the user may adjust the sensitivity of the alignment device.

The alignment indicator is preferably able to provide an indication from which it may be determined whether the alignment of the machine has deviated from the target orientation and an indication of the general direction of deviation. For example, the indication of the general direction of deviation may comprise an arrow that points in the general direction of the deviation or in the general direction in which the machine must be moved in order to correct the deviation. Preferably, the indication of the general direction of deviation comprises an indication of one of a number of possible different directions, the number being an integer greater than or equal to 2. For example, the indicator may comprise a first indicator which when activated indicates that the machine needs to be rotated in one sense and a second indicator which when activated indicates that the machine needs to be rotated in the opposite sense. Having just two different indications of directions of misalignment may in many applications be insufficient to allow easy correction of misalignments. Thus, in certain embodiments of the invention it is preferred that the indication of the general direction of deviation comprises an indication of one of a number of possible different directions, the number being an integer greater than or equal to 3. The number may be an integer greater than or equal to 8. The alignment indicator may be arranged to provide an indication of the direction of deviation, the number of directions that the indicator is able to indicate being greater than 100 and preferably effectively limitless. The alignment indicator may be arranged to provide an indication of the magnitude of the misalignment.

The alignment indicator may include visual indicating means. The visual indicating means may be in the form of one or more lights. The visual indicating means may be in the form of one or more symbols or other pictorial or written instructions, that display, light up or are otherwise activated according to the information to be conveyed to the user of the alignment device. The visual indicating means may include a single LED or other light emitting device that indicates a binary state of the system (i.e. "aligned" or "not aligned"). The visual indicating means may of course additionally or alternatively comprise other visual indicators. In one of the embodiments described herein the visual indicating means includes four, advantageously arrow-shaped, lights arranged in a cruciform arrangement that illuminate according to the corrective movement required of the machine. The four lights when illuminated individually are able to indicate one of four different directions of corrective movement. By illuminating a pair of adjacent lights to indicate a corrective movement in an intermediate direction, the four lights can be used to indicate one of eight possible different directions of corrective movement.

The alignment indicator may include aural indicating means. The aural indicating means may be in the form of a device that sounds an alarm to indicate when the machine is not correctly aligned. Alternatively, or additionally, the aural indicating means may be in the form of a device that sounds a tone to indicate when the machine is correctly aligned. The aural indicating means may for example comprise a buzzer, a bell, a loudspeaker, or other sound emitting device. The aural indicating means may indicate the direction of misalignment and/or the action required to correct the alignment. The aural indicating means may for example be able to synthesize or reproduce spoken words to instruct the user.

The alignment device may further comprise a reflecting means arranged such that the light from the light source that is directed towards the emitter travels via the reflecting means. The reflecting means may be formed by the surface of the work-piece, may comprise a separate mirror or may comprise any other reflective medium. In situations where the reflecting means is required to be located on the work-piece surface, and the work-piece surface itself does not have good reflecting qualities, for example if the surface is pitted, a reflective medium such as a reflective tape may be applied to the work-piece to cause reliable reflection of the light emitted from the source. After the required machining operation has been completed, any reflective medium applied to the surface of the work-piece may be removed. The first portion may for example comprise the reflecting means, the second portion comprising both the light source and the light detector.

The first and second portions of the alignment device may be physically separable. Preferably, however, the first and second portions are arranged to be mechanically coupled during normal usage. The mechanical coupling may be in the form of a flexible coupling. The mechanical coupling may comprise a slide that allows relative sliding movement between the first and second portions. The mechanical coupling may be such that movement of the first and second portions relative to each other in a manner that changes their separation is restricted (or optionally prevented) whilst permitting movement that changes the relative orientation of the first and second portions.

The first portion is conveniently flexibly mounted in relation to the second portion. The flexible mounting is conveniently arranged to allow the first portion to pivot relative to the second portion whilst restricting lateral movement therebetween. The first portion may be resiliently mounted in relation to the second portion. Preferably the first and second portions are mounted for movement together relative to the machine. For example, the first and second portions may be mounted for movement relative to the machine to allow the machine to move towards and away from the work-piece, whilst the separation of the first and second portions relative to work-piece remains substantially constant. Also, the first and second portions may be mounted such that if the machine is moved parallel to the work-piece surface the first and second portions move parallel to the work-piece surface with the machine, whilst the separation of the first and second portions relative to machine remains substantially constant. Preferably, at least the first portion is resiliently mounted relative to the machine so that the first portion is urged away from the machine in the direction of the work-piece. This may be achieved by resiliently mounting the second portion relative to the machine, so that the first and second portions are together urged away from the machine in the direction of the work-piece. The resilient mounting of the first portion relative to the machine and/or the second portion may be in the form of a spring.

The surface of the work-piece to be machined will typically, but not necessarily, be flat. In such cases it is preferred that the first portion includes a generally flat surface for contacting the surface of the work-piece. The first portion may alternatively comprise three feet for contacting the surface of the work-piece.

The alignment device is preferably so configured that, during machining of the work-piece, the machine may be moved towards and away from the work-piece without lifting the first portion away from the surface of the work-piece. Of course, when not machining, and/or if the machine is moved away from the surface of the work-piece by more than a certain distance, the first portion may be caused to lift-off from the surface.

Advantageously, one of the light source and detector is associated with the first portion and the other is associated with the second portion. Preferably, the light source is associated with the first portion and the light detector is associated with the second portion.

The source may be in the form of a light emitting semiconductor device. The source may for example be in the form of an LED or a low-powered laser device. The source need not emit visible light and may for example emit light predominantly in the infra-red range.

The detector may be in the form of a single light sensor, such as for example a photodiode. Of course, such a single sensor would be able to detect only whether the machine is or is not correctly aligned. The detector preferably comprises a plurality of light sensing devices. The detector may for example comprise an array of light sensors. The detector may for example be in the form of a quad-cell light detector. The array of sensors may define a central point, which is so positioned that when the machine is correctly aligned the light from the light source is centered on the central point. Preferably, there are four or more light sensors in the array.

The first portion and the second portion are preferably mounted within an enclosure. The enclosure preferably protects the light detector from ambient light that might otherwise detrimentally affect the detection of light from the light source. The enclosure preferably protects the light source and detector from debris generated during machining of the work-piece. The first and second portions may for example be accommodated within a closed housing, which may or may not be sealed.

The means by which signals from the light detector are converted into an output of the indicator device may comprise a simple electronic circuit. Preferably, the alignment device includes a processing unit. The processing unit may, for example, process signals derived from the output of the light detector to generate an output signal that determines the indication made by the alignment indicator. Preferably, the alignment device includes a control unit. The control unit may for example control the light emitted by the light source. The control unit may include or be in the form of a processing unit.

The alignment device may be a component that is able to be fitted to any machine to assist alignment of the machine during machining. Such a device could for example be fitted to a hand-held tool, such as a drill. The alignment device may form a permanent and/or integral part of a machine.

The present invention also provides a machine for machining into a work-piece, the machine including an alignment device including:

(a) a light source, (b) a light detector for detecting light from the light source, (c) a first portion that in use abuts a surface of the work-piece, (d) a second portion that in use moves in dependence on the angular position of the machine relative to the work-piece, and (e) an alignment indicator, the machine and device being so arranged that in use:

(i) movement of the machine in at least one direction causes movement of both the first and second portions, whereas the machine is able to be rotated in such a way that the second portion, but not the first portion, rotates, (ii) the intensity of the light received by the detector from the source depends on the relative positions and orientations of the first and second portions, and (iii) the indicator outputs, in dependence on an electronic signal sent by the detector in response to the intensity of light received by the detector from the source, an indication of the deviation of the machine relative to the work-piece from a target orientation.

The deviation of the machine relative to the work-piece from a target orientation may be a measure of the orientation of an operational axis relative to a target orientation. By way of example, the operational axis for a drilling tool may be defined as the rotational axis of a drill bit in the drilling tool. The target orientation may be the orientation of the machine when the operational axis is substantially perpendicular of the surface of the work-piece. In the case of drilling, this allows a fastener subsequently inserted in a hole drilled, using a machine including an alignment device of the invention, to seat properly and thus form a strong joint. The target orientation may be the orientation of the machine when the operational axis is positioned within a predetermined angle of a particular direction, for example the normal of the surface of the work-piece. The predetermined angle may be 5° or 3°. The predetermined angle is preferably 1°.

The machine may be a drilling machine. The machine may be a cold-working tool, for example a cold-working gun. The machine may be a portable machine, such as a hand-held tool for example. The machine may be in the form of a hand-held power tool. The alignment device may be slidably mounted on the hand-held tool.

Features of, or relating to, the alignment device described herein may of course be incorporated into the alignment device of the machine according to this aspect of the invention.

The invention yet further provides a method of aligning a machine relative to a work-piece by means of an alignment device including (a) a light source, (b) a light detector for detecting light from the light source, (c) a first portion, (d) a second portion, the intensity of the light received by the detector from the source depends on the relative positions and orientations of the first and second portions, and (e) an alignment indicator, the method including the steps of:

placing the machine relative to the work-piece in approximate alignment with a target orientation, with the first portion abutting a surface of the work-piece, the detector sending an electronic signal in response to the intensity of light received by the detector from the source, the indicator outputting, in dependence on the signal sent by the detector, an indication of the deviation of the machine relative to the work-piece from the target orientation, moving the machine in response to the indication outputted by the indicator, and machining the work-piece with the machine, whereby a deviation of the alignment of the machine relative to the work-piece from the target orientation may be reduced.

The step of moving the machine in response to the indication outputted by the indicator of the method is preferably performed manually by an operator of the machine. It will of course be understood that the operator may when machining the work-piece unintentionally move the machine in such a way as to maintain or increase the misalignment of the machine relative to the work-piece. As such the method may be performed in such a way that the machine is at least some of the time misaligned relative to the target orientation. However, the method of the invention enables such misalignments to be detected and responded to promptly by the operator.

The indicator may indicate whether or not the machine is aligned relative to the work-piece in accordance with the target orientation, within a given error threshold. The error threshold may be preset. The error threshold may be fixed. The error threshold may comprise a preset value adjustable by the operator. The method preferably includes a step of the operator adjusting such a preset error threshold, thereby adjusting the sensitivity of the alignment device.

It will of course be appreciated that features described with reference to the apparatus of the invention may be incorporated in the method of the invention and vice versa. For example, the alignment device described herein with reference to any aspect of the apparatus of the invention may be used when performing the method of the invention. Also, the alignment device of the present invention may be adapted for use in accordance with any aspect described herein of the method of the invention.

BRIEF DESCRIPTION OF THE DRAWINGS

Embodiments of the present invention will now be described by way of example with reference to the accompanying schematic drawings in which.

DETAILED DESCRIPTION OF THE DRAWINGS

Figure 1:
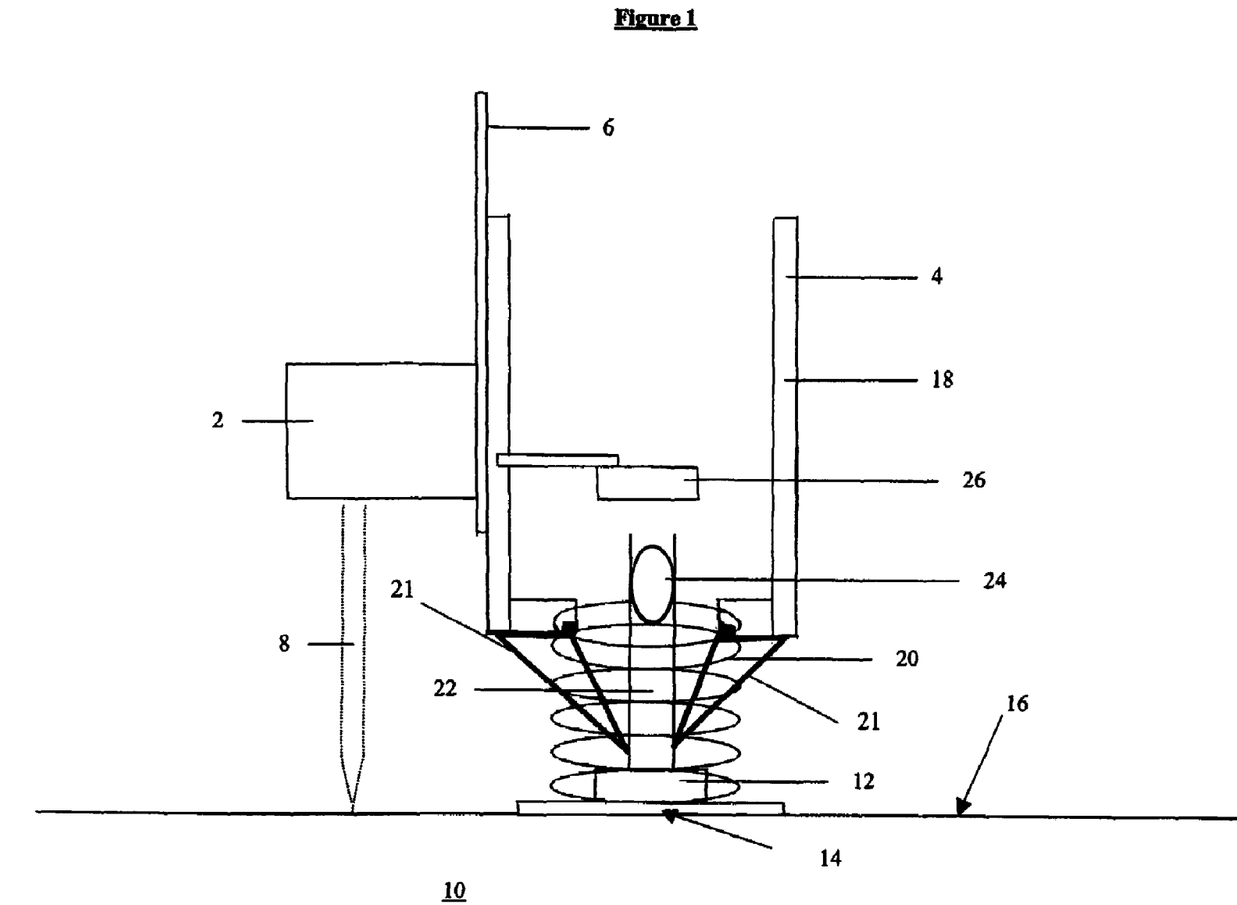
FIG. 1 shows a hand-held drill and alignment device according to a first embodiment.

FIG. 1 shows a tool 2 having an alignment device 4 attached thereto via a slide mounting mechanism 6. The tool 2 as shown in FIG. 1 includes a drill bit 8 for machining into a work-piece 10. The slide mechanism 6 enables the alignment device to move upwards relative to the tool 2 as the drill bit 8 enters the work-piece 10. The alignment device 4 includes a pressure foot 12 having a flat base 14 for abutting the surface 16 of the work-piece 10. The foot is resiliently mounted on the main body 18 of the alignment device 4 by means of a spring 20. A centrally mounted leg 22 projects upwardly from the foot 12. The mounting of the foot 12 relative to the body 18 of the device 4 is such that the foot 12 may pivot in all directions relative to the body 18. Stabilisers 21 extend from the lower surface of the body 18 towards the lower end of the leg 22 and restrict lateral movement of the foot 12 relative to the body 18, whilst permitting pivoting motion and vertical motion towards and away from the body 18.

The arrangement of the foot 12 and main body 18 of the device 4 relative to the tool 2 is such that (1) the foot 12 body 18 and tool 2 may all be translated, without relative movement between them, along the surface of the work-piece 10, (2) the foot 12 and body 18 may move, without relative movement between them, up and down relative to the tool 2 by means of the slide mechanism 6, and (3) the tool 2, when pivoted about the point at which the drill bit 8 enters the work-piece 10, causes the body 18 to pivot relative to the foot 12. Thus, the tool 2 may be moved to drill different regions of the work-piece and may be moved towards and away from the work-piece 10 without affecting the operation of the alignment device 4. Also, when the angle at which the drill 8 meets the surface 16 of the work-piece 10 is changed, the relative positions of the foot 12 and the body 18 of the alignment device also changes, thereby enabling the alignment device 4 to detect a change in orientation of the drill 8 of the tool 2 relative to the work-piece 10.

Figure 2:
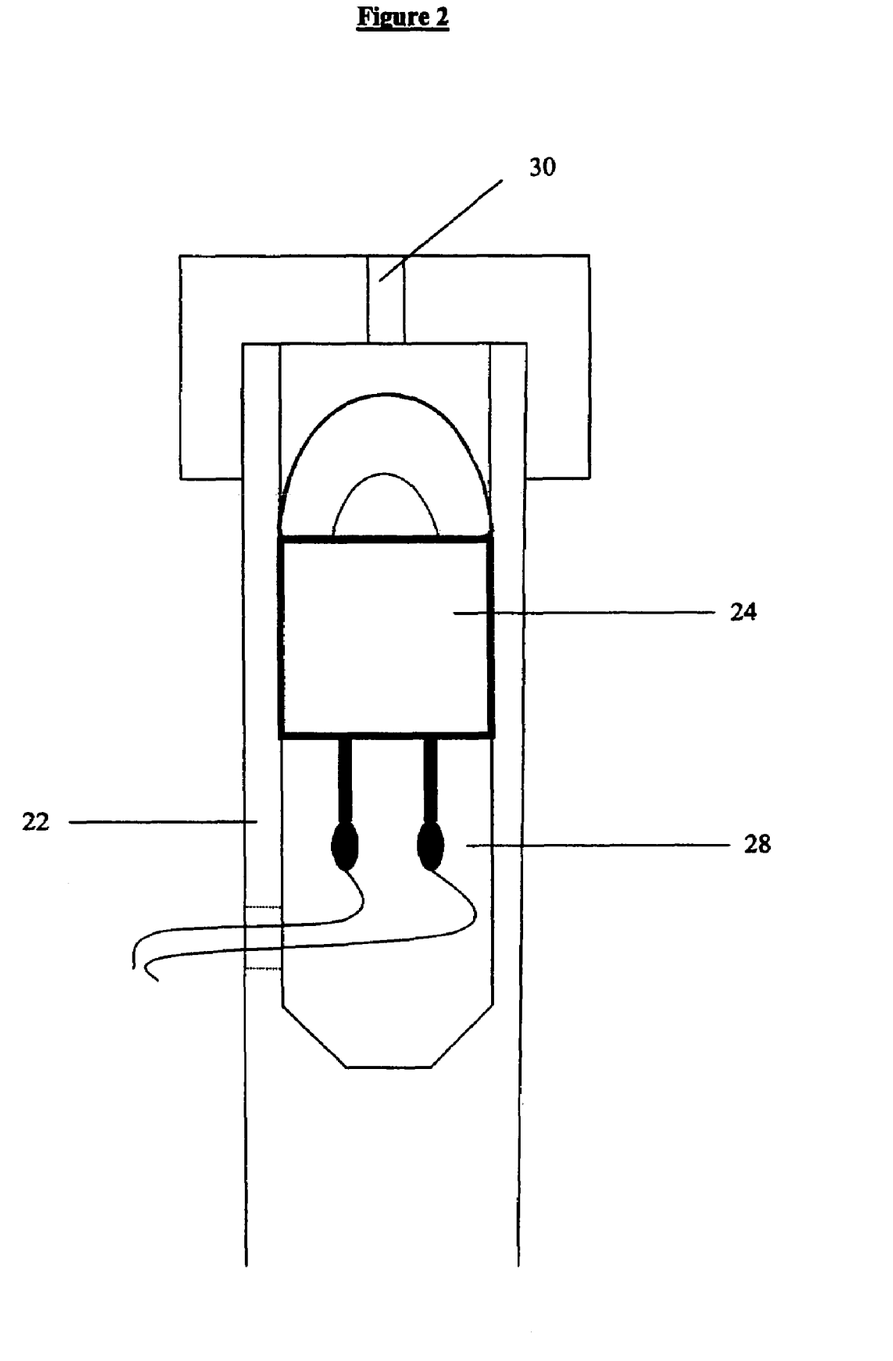
FIG. 2 shows a light source of the alignment device of FIG. 1.

The leg 22 accommodates at its upper end a light source in the form of an LED 24. The LED 24 is rigidly mounted relative to the foot 12. The main body 18 of the device 4 includes a light detector 26 arranged above and opposite the LED 24 so as to receive light from the LED during use of the alignment device 4. The arrangement of the LED 24 is illustrated schematically by FIG. 2. The leg 22 includes a hollow section 28 which accommodates the LED 24. Light from the LED 24 is, during use, permitted through a small aperture 30, thereby producing a relatively collimated beam of light. The detector of this embodiment is in the form of a simple single photodiode.

Figure 3:
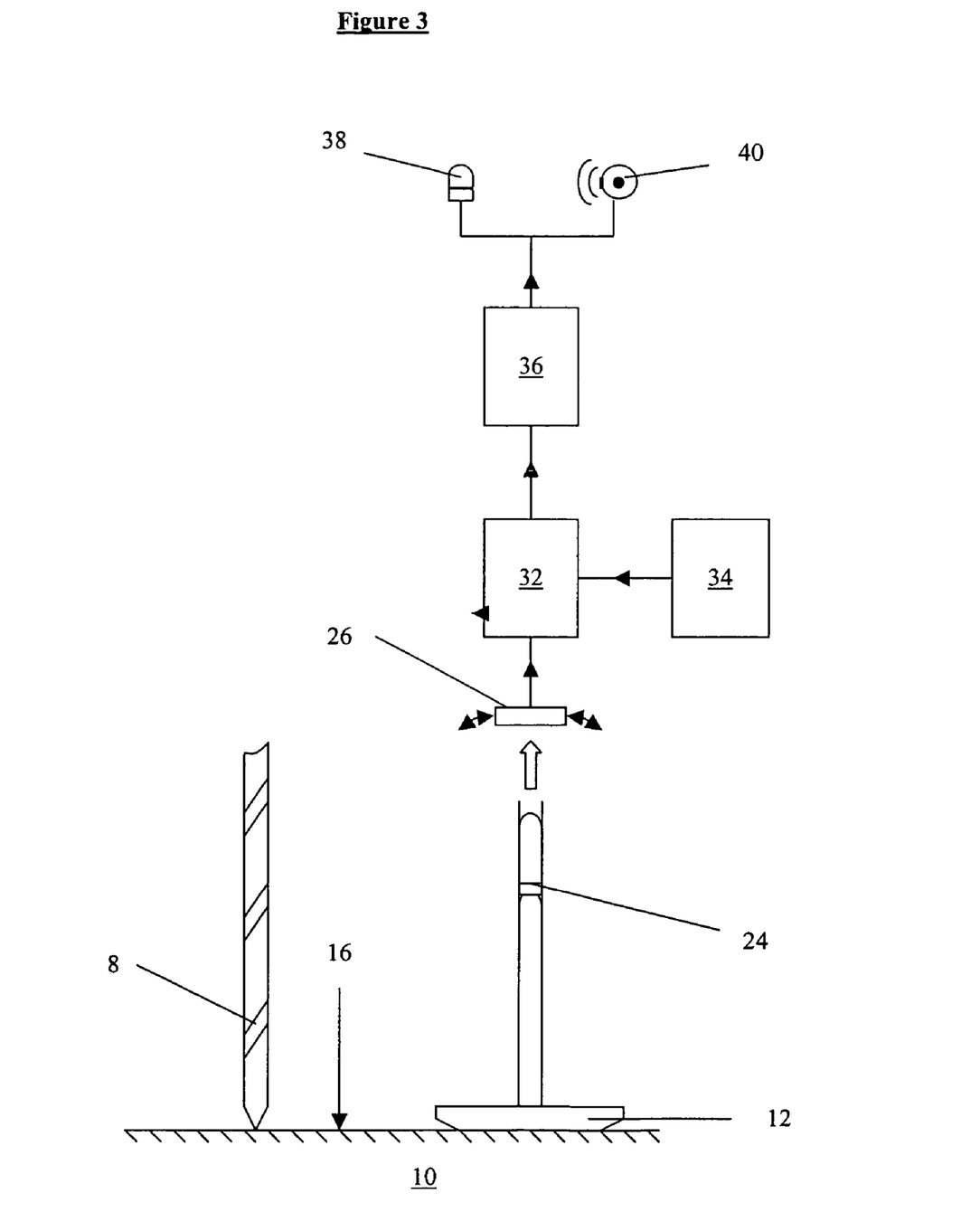
FIG. 3 is a schematic block diagram illustrating the function of the alignment device of FIG. 1.

The alignment device 4 further includes control circuitry not shown in FIG. 1, but illustrated schematically in FIG. 3. The light detector 26 produces an output voltage dependent on the intensity of light received from the LED 24. This output is received by a comparator 32, which compares the output voltage with a preset voltage, the preset voltage being provided by a sensitivity-setting circuit 34. The comparator sends a binary output signal indicating whether or not the voltage received from the detector 26 is greater than the voltage set by the sensitivity-setting circuit 34. The output from the comparator 32 is received by an output drive circuit 36 that produces, in response to the output, a current that drives both an optical output 38 and an audio output 40.

The alignment device 4 is arranged so that when the drill bit 8 is perpendicular to the surface 16 of the work-piece 10 the light from the LED 24 is received at the light detector 26 so that the center of the photodiode of the light detector 26 is centrally aligned with the light beam, thereby providing the maximum possible output voltage. The optical output 38 is in the form of a bi-colour LED able to emit both green light and red light. The audio output 40 is in the form of a piezo-buzzer. The sensitivity-setting circuit 34 comprises a potentiometer that enables the output of the setting circuit 34 to be adjusted. Before use, the sensitivity of the alignment device 4 is preset by adjusting the potentiometer as appropriate.

In this first embodiment, the potentiometer is preset such that the voltage output of the setting circuit 34 is equal to the voltage that would be outputted by the detector 26 when the angle of the axis of the drill bit 8 is at 1° from the normal to the surface of the work-piece 10. During use, when the drill axis is at 90°±1° to the work-piece the light intensity received by the detector 26 from the LED 24 is such that the voltage output from the light detector 26 is greater than the voltage from the sensitivity-setting circuit 34. Thus the comparator 32 outputs an "on" signal indicating that the tool is properly aligned. The drive circuit 36 then, in response to the "on" signal so received from the comparator 32, causes the optical output 38 to emit a green light, whereas no output is provided by the audio output 40.

If the drill bit 8 deviates from the normal by more than 1°, then the light intensity received at the detector 26 falls such that the voltage outputted by the detector 26 falls below the voltage outputted by the sensitivity-setting circuit 34 and thus the comparator 32 outputs an "off" signal which causes the output drive 36 to activate the audio output 40 to sound the buzzer and to cause the bi-colour LED of the optical output 38 to emit a red light. Thus an operator of the drill can easily ascertain when the drill bit 8 is correctly aligned and when to take action to correct a misalignment of the drill bit 8.

Figure 4:
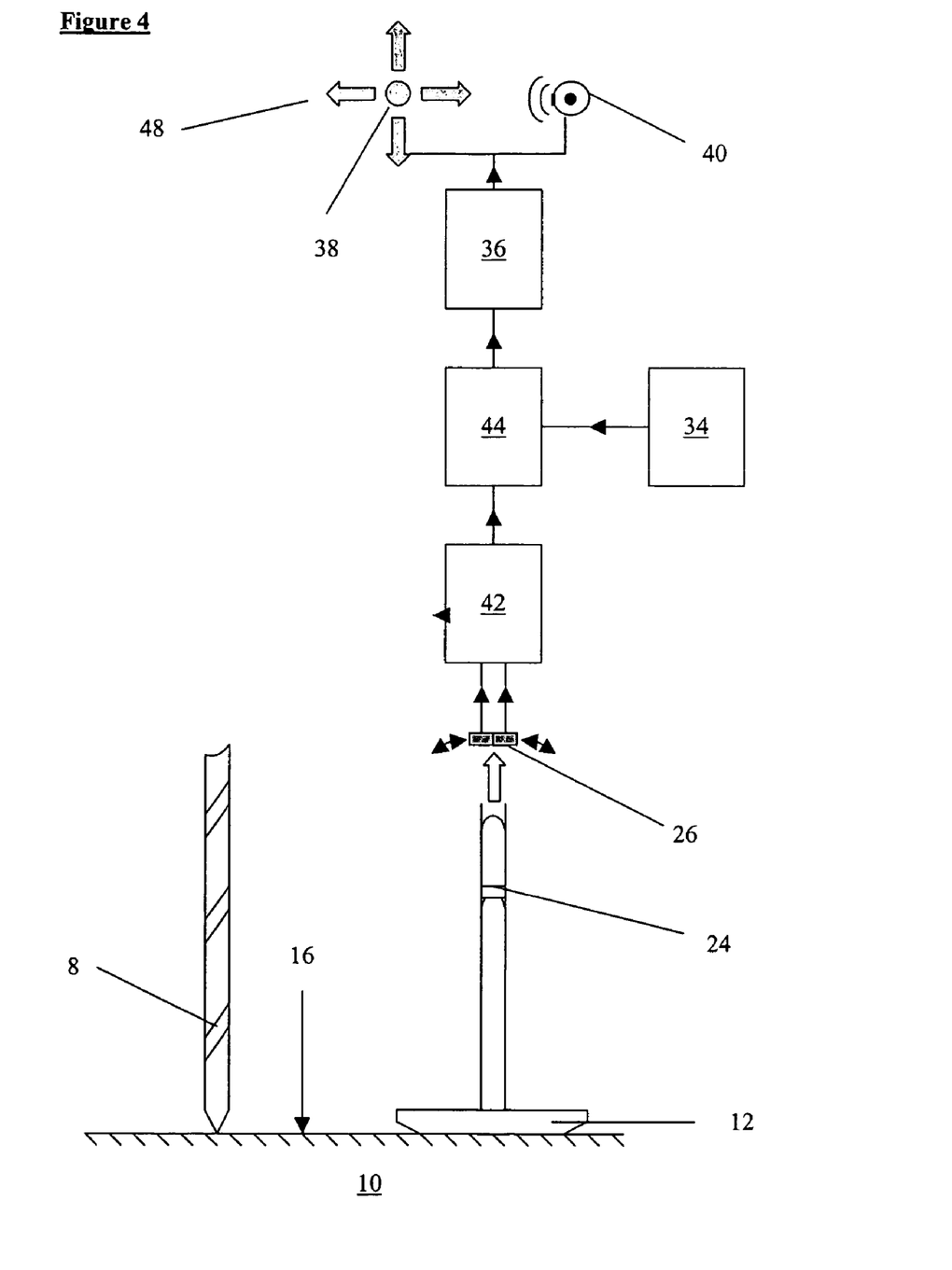
FIG. 4 is a schematic block diagram illustrating the function of an alignment device according to a second embodiment.

A second embodiment is illustrated schematically by FIG. 4. The alignment device 4 of the second embodiment is similar, but more sophisticated than, the alignment device of the first embodiment. For example, the arrangement of the tool 2, alignment device 4, light source 24 and light detector 26 are identical to that of the first embodiment. The main differences between the first and second embodiments will now be described.

Figure 5A:
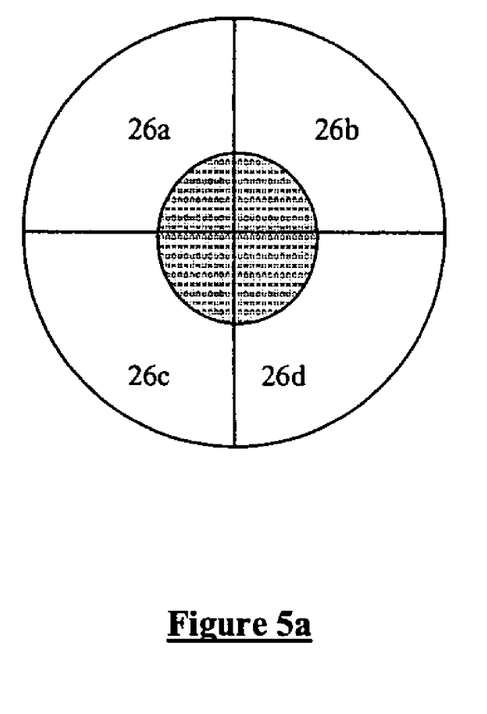
FIGS. 5a and 5b show a light detector, in use, of the alignment device of FIG. 4.
Figure 5B:
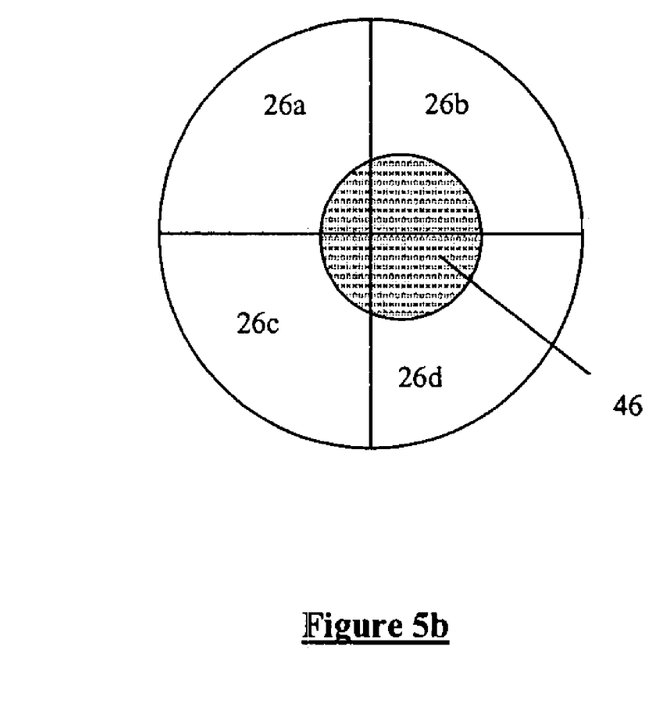

In the second embodiment, the detector 26 is in the form of a quad-cell light detector (an array of four light sensors), only two of which are shown in FIG. 4 for the sake of clarity. When the drill bit 8 is normal to the work-piece surface 16, the center of the spot of light illuminating the detector 26 from the light source 24 is in the center of the array of light sensors, such an arrangement is shown schematically in FIG. 5a which shows the detector 26 comprising four quadrant light sensors 26a-26d and a light spot 46. The signals from each sensor of the quad-cell detector 26 are converted from analogue signals to digital signals by an analogue to digital converter 42 and are then fed to a processing unit 44. The processing unit 44 receives a further input from a sensitivity-setting circuit 34 which enables the user to set the sensitivity of the alignment device 4 in a similar manner to that of the first embodiment. From analysing the signals received from the four light sensors it is possible for the processing unit 44 to ascertain the position of the light spot 46 in the quad-cell light sensor arrangement (provided that at least one of the light cells 26a-26d is illuminated by the light from the LED 24 of the light source).

In a similar manner to that of the first embodiment, the outputs driven by the output drive circuit 36 include an optical output 38 comprising a simple red/green LED and a buzzer 40. However the second embodiment further includes an additional optical output in the form of a cruciform arrangement of lights 48 that are representative of directions.

During use, the processing unit 44 receives, via the analogue-to-digital converter 42, signals from the detector 26 that enable the processing unit to ascertain the position of the light spot 46 received at the detector 26. If the spot is aligned close enough to the center of the light detector, within a threshold distance determined by the setting of the sensitivity circuit 34, then the LED of the optical output emits 38 a green light and the buzzer of the audio output emits a constant tone. If however the light spot deviates from the center position by more than the threshold amount and illuminates at least part of one of the sensors of the quad-cell detector 26 then the processing unit 44 instructs the drive circuit 36 not to sound the buzzer of the audio output 40 and not to illuminate the red/green LED, but to illuminate the arrow symbols 48 to indicate the direction in which the operator must move the drill in order to correct the misalignment. The cruciform arrangement of arrows is used to indicate one of eight directions of corrective movement. One arrow is illuminated if the direction of corrective movement is within 22.5° of the direction in which that arrow is pointing. If the direction of corrective movement is in a direction between two arrows, and more than 22.5° away from each arrow, then both of the two arrows are illuminated to indicate to the operator that the corrective movement is roughly in line with the direction between the two arrows.

If the processing unit 44 receives signals that indicate that none of the sensors of the quad-cell detector are illuminated by the light from the light source 24 then an "out of range" signal is sent from the processing unit 44 to cause the output drive circuit 36 to sound the buzzer of the audio output to emit intermittent tones (a bleeping noise), to cause all arrows to flash and to cause the red/green LED to emit a red light. Thus, not only is the operator able to ascertain when the drill is correctly aligned, but is also provided with directional information to enable him to correct any misalignment during machining.

A third embodiment (not shown) is similar to the second embodiment except that the optical output indicates the direction of the deviation, i.e. the direction away from which the operator must move the drill in order to correct the misalignment. Furthermore, rather than an arrangement of arrow symbols, the optical output of the third embodiment simply comprises four red LEDs located around a central green LED in a cruciform arrangement. In use, the processing unit receives, via the analogue-to-digital converter, signals from the detector that enable the processing unit to ascertain the position of the light spot received at the detector. If the spot is aligned close enough to the center of the light detector, within a threshold distance determined by the setting of the sensitivity circuit, then the central LED of the optical output emits a green light. If however the light spot deviates from the center position by more than the threshold amount and illuminates at least part of one of the sensors of the quad-cell detector then the processing unit instructs the drive circuit not to illuminate the green LED, but to illuminate a red LED to indicate the direction of the deviation of the machine, relative to the work-piece, from a target orientation. The cruciform arrangement of red LEDs is used to indicate one of eight directions of deviation. One red LED is illuminated if the direction of deviation is within 22.5° of a notional straight line between the red LED and the central LED. If the direction of deviation is in a direction between two red LEDs, and more than 22.5° away from the notional straight lines between each red LED and the central LED, then both of the two red LEDs are illuminated to indicate to the operator that the deviation is roughly the direction between the two LEDs.

Figure 6:
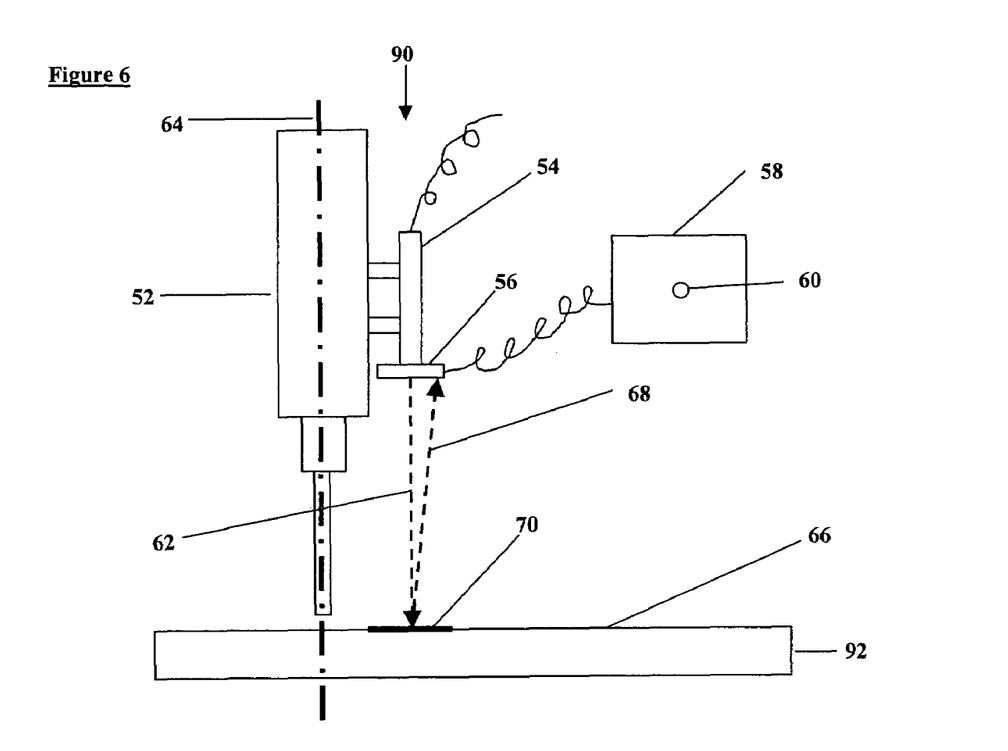
FIG. 6 shows a hand-held drill and alignment device according to a fourth embodiment.
Figure 7:
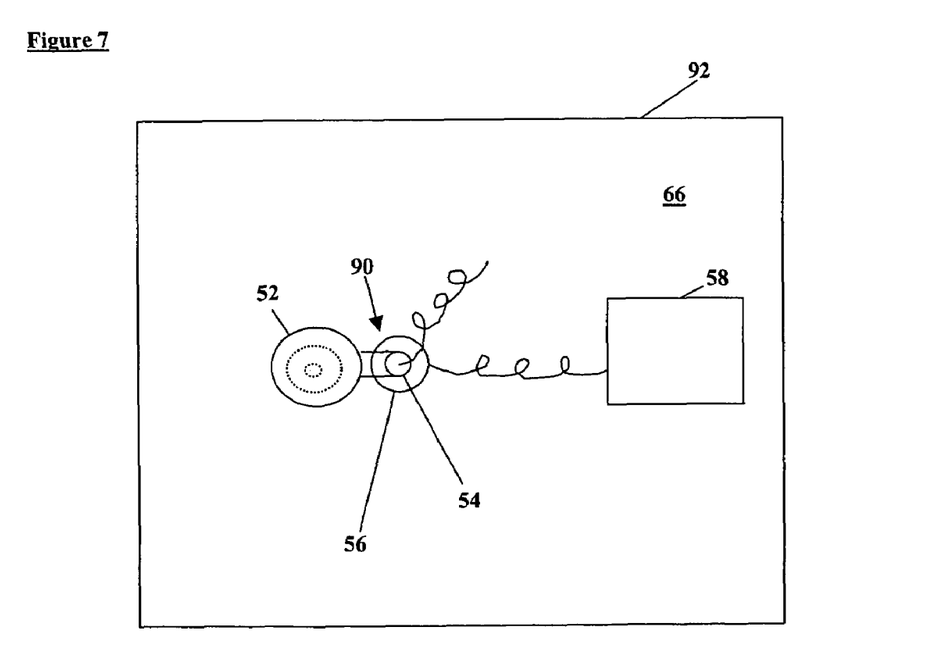
FIG. 7 is a plan view of the apparatus shown in FIG. 6.

A fourth embodiment is illustrated by FIGS. 6 and 7, which show a hand-held drill 52 on which is fixed an alignment device 90 comprising a low-powered laser source 54, a detector array 56 which surrounds part of the laser source 54 and an indicator 58 that is connected to the array 56. The indicator 58 contains an indicator lamp 60. When the laser source 54 is activated it directs a collimated incident light beam 62 in a direction parallel to the operational axis 64 of the hand-held tool 52 and towards the work-piece surface 66. The incident light beam 62 then strikes the work-piece surface 66 and is reflected back as the reflected light beam 68. To improve reflectivity of the work-piece surface 66 a piece of reflective tape 70 is temporarily adhered to the surface 66. When the hand-held drill 52 is held within 3° of perpendicular to the work-piece surface 66, the reflected light beam strikes the detector array 56 and the indicator 58 causes the indicator lamp 60 to illuminate; the operator may then advance the hand-held drill 52 towards the work-piece 92 and drill a perpendicular (or close to perpendicular) hole in the work-piece 92. When the hand-held drill 52 is held so that the drill axis is at greater than 3° from perpendicular to the work-piece surface 66 the reflected light beam is directed away from the detector array 56 and the indicator 58 does not cause the indicator lamp 60 to illuminate; the operator then knows not to operate the hand held drill 52. The operator must position the hand-held drill 52 so that the indicator lamp 60 is illuminated constantly whilst he is drilling the hole. In this fourth embodiment of the invention the accuracy is such as to enable a hole to be reliably drilled in the work-piece 92 within 3° of perpendicular. Naturally greater or lesser accuracy, as desired, may be selected by adjusting the size of the detector array.

Figure 8:
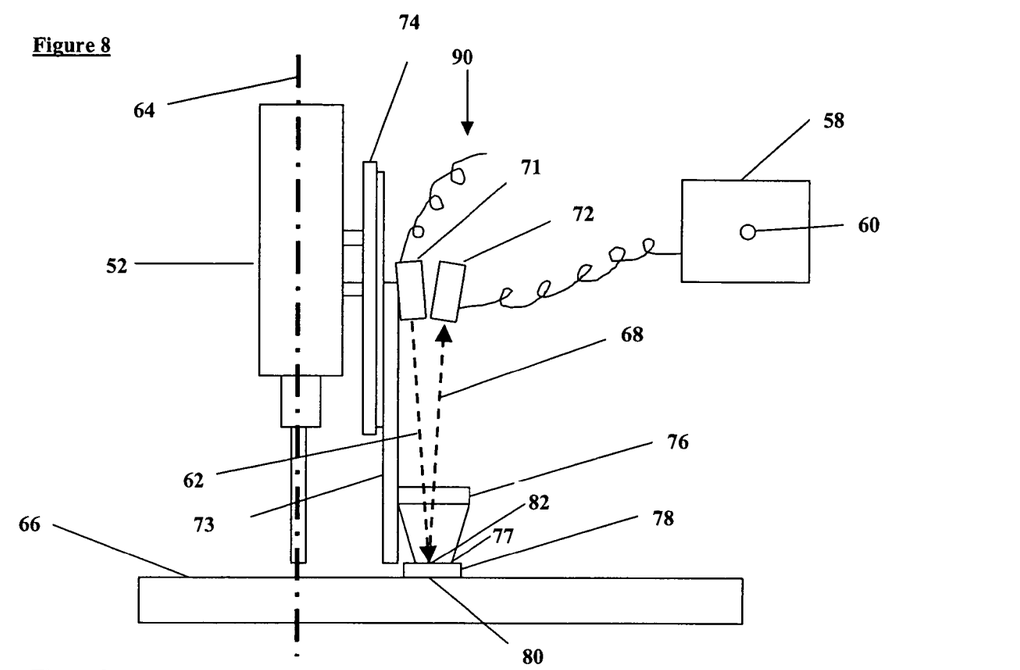
FIG. 8 shows a hand-held drill and alignment device according to a fifth embodiment.
Figure 9:
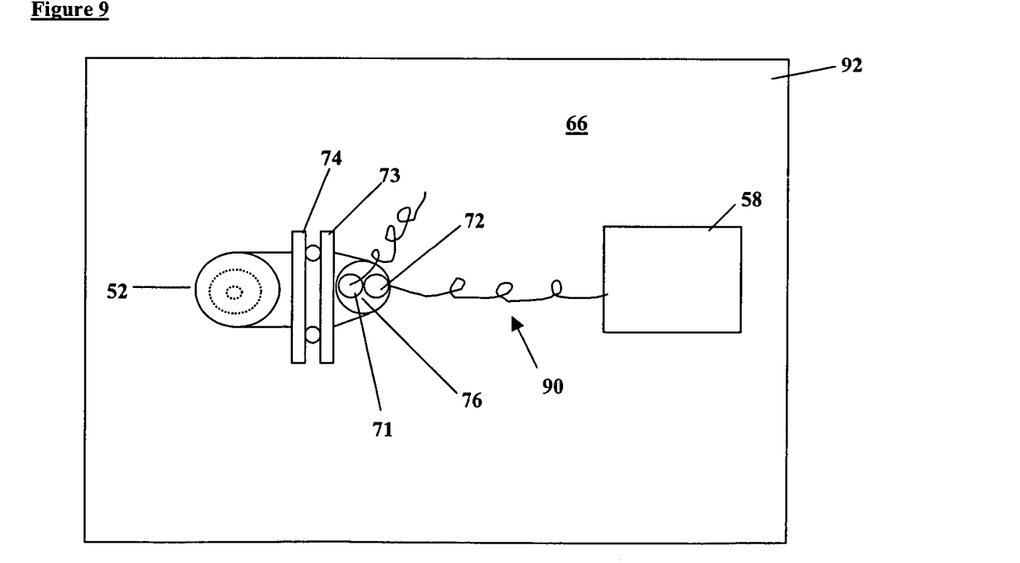
FIG. 9 is a plan view of the apparatus shown in FIG. 8.

FIGS. 8 and 9 illustrate a fifth embodiment of the invention which allows generally perpendicular alignment of a hand-held drill 52 relative to a work-piece surface 66 where the surface 66 may be non-reflective or may have a locally rough texture, but without the necessity of using reflective tape adhered to the surface 66. In this embodiment the alignment device 90 comprises a high-powered light-emitting diode (LED) 71 and a detector 72 which are fixedly mounted on a sliding member 73 which is constrained to slide parallel to the operating axis 64 of the hand-held drill 52 on a mounting system 74, which in turn is affixed to the hand-held drill 52. The sliding member 73 is biased by a spring towards the end of its travel in the direction of the work-piece 92. The alignment device 90 also comprises a guide 76 fixedly mounted on the sliding member 73 and a work-piece contact portion 78 movably attached to the guide 76. The guide 76 is of approximately hollow conical shape, positioned such that an incident light beam 62 is directed through its center onto the work-piece contact portion 78. The axis of the guide 76 is parallel to the axis 64 of the hand-held drill 52. The work-piece contact portion 78 has two flat, parallel faces 80, 82 and is resiliently mounted in such a way that it may pivot relative to the sliding member 73. The lower, parallel face 80 is pressed against the work-piece surface 66 when in use. The upper, parallel face 82 is optically reflective. The axes of the LED 71 and the detector 72 are each disposed at a small angle to the axis of the guide 76 and arranged so that said axes are directed at the same point of the upper face 82. The LED 71, detector 72 and work-piece contact portion 78 are so mounted that when the work-piece contact portion 78 and guide 76 are retracted, with the normal of the lower face 80 of the work-piece contact portion 78 being parallel to the drill axis 64, so that the work-piece contact portion 78 is in its rest position, the incident light beam 62 is reflected back towards the detector 72 so that the detector is fully illuminated. The alignment device 90 is positioned relative to the hand-held drill 52 such that as the drill 52 is moved towards its operating position, and with its operating axis 64 approximately perpendicular to the work-piece surface 66, the sliding member 73 is at a limit of its sliding travel and touches the work-piece surface 66 just before the hand-held drill 52 reaches its operating position. The work-piece contact portion 78 is urged, by means of the biasing of the spring that biases the sliding member 73, against the work-piece surface 66. Since the work-piece contact portion 78 may pivot relative to the sliding member 73, the lower parallel face 80 of the work-piece contact portion 78 is pressed flat against the work-piece surface 66. If the hand-held drill 52 is substantially normal to the work-piece surface 66, the incident light beam 62 is reflected (see the reflected light beam 68 in FIG. 8)

from the upper face 82 of the work-piece contact portion 78 and the light fully illuminates the detector 72. A detection signal is passed from the detector 72 to the indicator 58, which causes the indicator lamp 60 to emit a green-coloured light, which indicates to the drill operator that the hand-held drill 52 is aligned correctly and that operation of the drill 52 may continue. If the hand-held drill 52 is not substantially normal to the work-piece surface 66, then the work-piece contact portion 78, whilst lying flat against the work-piece surface 66, will have pivoted relative to the guide 76, so that the guide 76 is in an inclined orientation relative to the work-piece contact portion 78. Thus, the path of the reflected light beam 68 is directed away from the detector 72, no light is detected and therefore no detected signal is passed to the indicator 58. The indicator lamp 60 then emits a red-coloured light. Thus the operator is informed that the drill 52 is misaligned and that operation of the drill 52 should not continue. The accuracy of this embodiment of the invention is such as to enable a hole to be drilled in the work-piece 92 within 3° of the perpendicular.

As an extra safeguard against incorrect operation of the hand-held drill 52, the detection signal from the detector 72 may be used as an input to a control system of the drill in such a way that the drill 52 will not operate unless the signal is present and thus the drill 52 is aligned substantially perpendicular to the work-piece surface 66. All of the elements of the alignment device 90, including the indicator 58 and indicator lamp 60 may be constructed if required as a self-contained, battery-powered unit mounted on the sliding member 73.

The present invention has particular application in relation to the manufacture of components on an assembly line and in particular in relation to the manufacture of aircraft. For example, where access to the drilling location is restricted, as is common in aircraft manufacture, drilling tools having a 90° drive are often employed. Any of the above-described embodiments may be readily adapted for use on such a drilling tool, thereby allowing accurate alignment of the drill relative to the work-piece despite the operator not being able to sight directly along the drilling axis.

The present invention also has application in relation to hand-held power tools, such as those used by DIY enthusiasts and professionals alike.

Whilst the present invention has been described and illustrated with reference to particular embodiments, it will be appreciated by those of ordinary skill in the art that the invention lends itself to many different variations not specifically illustrated herein. For that reason, reference should be made to the claims for determining the true scope of the present invention. By way of example, certain variations to the above-described embodiments will now be described.

The alignment device may for example be arranged to allow an operator to drill at an angle to the work surface different from the perpendicular. The provision of an aperture to produce a collimated beam of light may be rendered unnecessary by means of using LEDs that produce relative collimated beams of light or by means of providing a suitable lens.

The invention claimed is:

1. An alignment device, the device being suitable for use with a machine that machines into a work-piece, the device including:
   (a) a light source,
   (b) a light detector for detecting light from the light source,
   (c) a first portion that in use abuts a surface of the work-piece,
   (d) a second portion that in use moves in dependence on an angular position of the machine relative to the work-piece,
   (e) an alignment indicator, and
   (f) a processing unit,
   wherein
   (g) the first and second portions of the alignment device are mechanically coupled,
   (h) the first portion is resiliently mounted to the second portion for movement relative to the machine,
   (i) one of the light source and light detector is disposed on the first portion and the other is disposed on the second portion,
   (j) the device being so arranged that in use:
   movement of the machine in at least one direction causes movement of both the first and second portions, whereas the machine is able to be rotated in such a way that the second portion, but not the first portion, rotates, and
   during machining of the work-piece, the machine may be moved towards and away from the work-piece without lifting the first portion away from the surface of the work-piece,
   the intensity of the light received by the detector from the light source depends on the relative positions and orientations of the first and second portions, and
   the light detector sends an electronic signal in response to the intensity of light received by the detector from the light source, and
   the processing unit processes signals derived from the electronic signal from the light detector to generate an output signal that causes the alignment indicator to output an indication of the deviation of the machine relative to the work-piece from a target orientation, and
   (k) the alignment indicator has a plurality of indicating states including
   a first state representing the case where the deviation of the alignment of the machine from the target orientation is within one or more preset threshold directional deviation criteria, and
   a second state representing the case where the deviation of the alignment of the machine from the target orientation is not within said one or more criteria, the indication provided by the alignment indicator, when in the second state, comprising an indication of the general direction of deviation.

2. A device according to claim 1, wherein the one or more preset threshold directional deviation criteria are able to be adjusted by a user.

3. A device according to claim 1, wherein the indication of the general direction of deviation comprises an indication of one of a number of possible different directions, the number being an integer greater than or equal to 2.

4. A device according to claim 1, wherein the alignment indicator includes visual indicating means.

5. A device according to claim 1, wherein the alignment indicator includes aural indicating means.

6. A device according to claim 1, wherein the light detector comprises an array of light sensors.

7. A device according to claim 1, wherein the first portion and second portion are mounted within an enclosure.

8. A machine for machining a work-piece, the machine including an alignment device, the device including:
   (a) a light source, (b) a light detector for detecting light from the light source,
(c) a first portion that in use abuts a surface of the work-piece,
(d) a second portion that in use moves in dependence on an angular position of the machine relative to the work-piece,
(e) an alignment indicator, and
(f) a processing unit,
wherein
(g) the first and second portions of the alignment device are mechanically coupled,
(h) the first portion is resiliently mounted to the second portion in relation to the machine,
(i) one of the light source and light detector is disposed on the first portion and the other is disposed on the second portion,
(j) the machine and device being so arranged that in use:
movement of the machine in at least one direction causes movement of both the first and second portions, whereas the machine is able to be rotated in such a way that the second portion, but not the first portion, rotates, and
during machining of the work-piece, the machine may be moved towards and away from the work-piece without lifting the first portion away from the surface of the work-piece,
the intensity of the light received by the detector from the light source depends on the relative positions and orientations of the first and second portions, and
the light detector sends an electronic signal in response to the intensity of light received by the detector from the light source, and
the processing unit processes signals derived from the electronic signal from the light detector to generate an output signal that causes the alignment indicator to output an indication of the deviation of the machine relative to the work-piece from a target orientation, and
(k) the alignment indicator has a plurality of indicating states including
a first state representing the ease where the deviation of the alignment of the machine from the target orientation is within one or more preset threshold directional deviation criteria, and
a second state representing the case where the deviation of the alignment of the machine from the target orientation is not within said one or more criteria, the indication provided by the alignment indicator, when in the second state, comprising an indication of the general direction of deviation.

9. A machine according to claim 8, wherein the machine is a hand-held tool.

10. A hand-held drill for drilling into a work-piece, the drill including
(a) a chuck for holding, in use, a drill-bit,
(b) an LED and a light detector for detecting light from the LED,
(c) a foot spring-mounted relative to the drill so that in use the foot abuts a surface of the work-piece at a location adjacent to a region of the work-piece to be drilled and is urged towards the work-piece,
(d) a housing for accommodating one of the LED and the light detector, the other of the LED and the light detector being operably connected to the foot,
(e) an alignment display, and
(f) a control circuit arranged to receive signals from the light detector and to send signals to the alignment display,
wherein the drill is so arranged that in use:
(g) movement of the drill parallel to a flat work-piece causes movement of both the foot and the housing together,
(h) rotational movement of the drill to change the angle of drilling relative to the work-piece causes corresponding rotational movement of the housing relative to the work-piece, but substantially no rotational movement of the foot relative to the work-piece, there thus being relative movement between the housing and the foot,
(i) during drilling of the work-piece, the drill may be moved towards and away from the work-piece without lifting the foot away from the surface of the work-piece,
(j) the light from the LED received by the detector provides information concerning the angle between the drill-bit of the drill and the work-piece, and
(k) in response to the signals received from the light detector, the control circuit sends a signal to the alignment display that causes the alignment display either to indicate a general direction of misalignment in the event that the drill is not aligned, within a given margin of error, with a target alignment or to indicate that the drill is correctly aligned.

11. A method of aligning a machine relative to a work-piece, the method including the steps of
(i) providing a machine including an alignment device, which includes:
(a) a light source,
(b) a light detector for detecting light from the light source,
(c) a first portion resiliently mounted to a second portion in relation to the machine, and
(d) an alignment indicator,
wherein the machine is so arranged that
one of the light source and light detector is disposed on the first portion and the other is disposed on the second portion, and
the intensity of the light received by the light detector from the light source depends on the relative positions and orientations of the first and second portions,
(ii) placing the machine relative to the work-piece in approximate alignment with a target orientation, with the first portion abutting a surface of the work-piece,
(iii) the light detector sending an electronic signal in response to the intensity of light received by the light detector from the light source,
(iv) the alignment indicator outputting, in response to the electronic signal sent from the light detector, an indication of a general direction of deviation of the machine relative to the work-piece from the target orientation, and
(v) manually moving the machine, in response to the indication outputted by the indicator, and to reduce the deviation of the alignment of the machine relative to the work-piece from the target orientation until the output of the alignment indicator indicates that the deviation of the machine relative to the work-piece from the target orientation is within one or more preset threshold directional deviation criteria.

12. A method according to claim 11, further including a step of machining the work-piece with the machine, wherein, during machining, the alignment indicator continues, in response to electronic signals sent from the light detector, either to output an indication of the general direction of deviation of the machine relative to the work-piece from the target orientation or to indicate that the deviation of the machine relative to the work-piece from the target orientation is within said one or more preset threshold directional deviation criteria.

13. A method according to claim 11, further including a step of machining the work-piece with the machine, wherein the machine includes a main body and a drilling tool having an axis that does not intersect the main body of the machine, the alignment indicator allowing an operator to align the drilling tool with a target orientation during the step of machining, despite the operator not being able to see directly along the drilling tool axis during machining.

* * * * *